United States Patent [19]

Syracuse et al.

[11] Patent Number: 4,752,841
[45] Date of Patent: Jun. 21, 1988

[54] ADDRESS MARK ENCODING FOR A RECORD STORAGE MEDIUM

[75] Inventors: Anthony A. Syracuse, Fairport; Michael G. Fairchild, Rochester, both of N.Y.

[73] Assignee: Eastman Kodak Company, Rochester, N.Y.

[21] Appl. No.: 943,398

[22] Filed: Dec. 19, 1986

[51] Int. Cl.$^4$ .............................................. G11B 5/09
[52] U.S. Cl. .......................................... 360/49; 360/40
[58] Field of Search .................... 360/49, 40, 43, 72.2; 369/59

[56] References Cited

U.S. PATENT DOCUMENTS 3,750,121 7/1973 Lee ....................................... 340/347
4,319,287 3/1982 Swanson ............................... 360/40

Primary Examiner—Vincent P. Canney

Attorney, Agent, or Firm—Dennis P. Monteith

[57] ABSTRACT

An information-bearing record medium (magnetic tape, disk, or an equivalent thereof) includes a stream of binary bits in which a binary 1 bit is normally represented by a signal transition at the middle of its corresponding bit cell and a binary 0 bit is normally represented by a signal transition at the trailing edge of its corresponding bit cell so long as the immediately following bit cell contains a binary 0 bit, whereby the spacing between successive normal signal transitions is at least one bit cell and is no greater than two bit cells. The binary bit stream includes an address mark byte, for identifying a future substream of data bits, defined by a unique pattern of signal transition having at least one normal signal transition missing, whereby at least one pair of successive signal transitions is separated by more than two bit cells and less than four bit cells.

7 Claims, 8 Drawing Sheets

ADDRESS MARK ENCODING FOR A RECORD STORAGE MEDIUM

BACKGROUND OF THE INVENTION

1. Field Of The Invention

The present invention relates generally to digital data recording. More particularly, the invention relates to the encoding of an address mark which is used to achieve synchronization within a stream of data bits.

2. Description Relative To The Prior Art

In the recording of digital data on a record storage medium—like magnetic tape, a disk (magnetic, magneto-optical, optical) or an equivalent thereof—the bits recorded are systematically arranged for data retrieval. With a disk, for example, a bit stream is divided into a plurality of sectors, each of which contains a predetermined number of bits, which are commonly arranged into two groups. The first group of bits is known as a sector header or preamble and the second group, which follows the sector header, is known as a data field.

Note that the use of the term "divided" is somewhat misleading since there may or may not be actual physical separation between the two groups of bits. Rather, the bits are recorded and/or played back as a continuous, uninterrupted bit stream, while the terms sector header and data field merely serve as a convenient means of identifying a particular portion of the bit stream.

The bits in a sector header include primarily record-keeping information for facilitating data transfer. A disk sector header, for example, may include variable frequency oscillator (VFO) synchronization bits, phase synchronization bits, a sector address, etc.

A data field primarily includes user data bits, error detection and correction bits, as well as servo information for tracking control. The data bits, in turn, may further be divided into minisectors containing a specific number of bits.

Either the sector header or the data field, or both, commonly also includes bits corresponding to one or more address marks. An address mark serves advantageously to achieve byte (a set of eight binary bits) synchronization—identifying the beginning of a sector header or data field. Because of its importance, multiple address marks within a given sector serve for redundantly providing byte synchronization.

In order to transmit binary bits via a transmission channel or to record them on a disk or magnetic tape, the bit stream is usually modified—an operation known as channel coding. A known manner of channel encoding is the so-called Miller technique, known also as delay modulation mark (DMM) or modified frequency modulation (MFM).

MFM and DMM are functionally identical. The difference between the two schemes is that MFM uses isolated pulses for representing an encoded bit stream, whereas DMM uses the MFM pulse train to produce a 2-state signal, a state transition occurring at every MFM pulse. MFM is most suitable for magnetic recording, whereas DMM is preferred for optical recording. An advantage of coding of either type is that the data handling capacity of a transmission channel is effectively increased because the encoded bit stream is self-clocking, thereby obviating the need to transmit and to record a synchronous timing signal.

For magnetic recording, the Miller technique is defined by the following well known encoding rules:

1. A binary 1 bit is encoded as an MFM pulse at the center of the corresponding bit cell. This pulse is commonly called a data bit.

2. A binary 0 bit is encoded as an MFM pulse at the boundary between its bit cell and the immediately following bit cell so long as the latter cell also contains a binary 0 bit. This MFM pulse is commonly called a clock bit. For optical recording—DMM—a signal transition, high to low or low to high, occurs in synchronism with each MFM pulse.

FIG. 1 is useful in explaining the Miller technique; FIGS. 1(b) and 1(a) show, respectively, an arbitrary sequence of binary bits and their corresponding bit cells, denoted T; FIG. 1(c) shows the bit sequence of FIG. 1(b) in non-return-to-zero (NRZ) form; FIGS. 1(d) and 1(e) show, respectively, the corresponding sequence of MFM pulses—clock and data bits—and DMM signal transitions. Note from FIGS. 1(d) and 1(e) that the time between successive signal transitions, either MFM pulses or DMM transitions, is at least one bit cell, T, but is never greater than two bit cells, 2 T. A "1−T spacing" occurs whenever there are two consecutive binary 1 bits or three consecutive binary 0 bits; a "1.5 T spacing" occurs whenever a 00 binary pattern precedes or follows a binary 1 bit; a "2−T spacing", on the other hand, is produced only by a 101 binary pattern.

A well known problem that must be handled in digital data recording is the need to detect an address mark in the stream of binary bits. It is known in the prior art to encode bits, representing an address mark, using a unique signal, either MFM or DMM, so that the address mark will not be mistaken for other bits, such as data, in the bit stream. U.S. Pat. Nos. 3,750,121 and 4,319,287 disclose an address mark pattern that is different from any other pattern that results when a bit stream is encoded. It is intended, of course, that such an address mark pattern would not be confused with other coded bits—sector header or data—in the bit stream.

A coded address mark, disclosed in U.S. Pat. No. 3,750,121, consists of alternating DMM pulses of 1.5 T and 2 T duration. Such a pattern of pulses is not achievable under normal Miller encoding rules because a 2 T pulse always corresponds to a "101" pattern, and, therefore, must always begin and end at the middle of a bit cell.

Similarly, encoded address mark patterns, derivable from U.S. Pat. No. 4,319,287, are also different from other normally encoded patterns. This is because each address mark pattern is constrained to have two pairs of successive MFM pulses separated by two bit cells (2 T) one pair of which, like the DMM address mark of the '121 patent, is forced to begin and end at the boundary between adjacent bit cells.

Although each address mark of the aforementioned prior art is different from any signal pattern that results when a bit stream is encoded under normal Miller rules, the pattern for each address mark still must satisfy the "1 T min−2 T max" rule of Miller coding. With each address mark of the aforementioned patents being relatively close in appearance to a normally encoded bit stream, a decoding operation requires that each signal transition be resolved precisely to accurately distinguish an encoded address mark from encoded data patterns.

SUMMARY OF THE INVENTION

In view of the foregoing, it is an object of the invention to represent an address mark by a unique pattern of signal transitions (either MFM or DMM) that is readily distinguishable from any pattern corresponding to a normally encoded stream of binary bits, to reduce the possibility of failing to detect an address mark or of detecting a false address mark from the bit stream. In a stream of binary bits in which a binary 1 bit is normally represented by a signal transition at the middle of a bit cell and a binary 0 bit is normally represented by a signal transition substantially at the boundary between an adjacent pair of bit cells corresponding to two successive binary 0 bits, the object is achieved by providing an encoded address mark byte defined by a unique pattern of signal transitions in which at least one normal signal transition is missing, to provide at least 2.5 bit cells and as many as 3.5 bit cells between at least one pair of successive signal transitions. Since the minimum normal time between successive signal transitions is one bit cell, the pattern for an address mark byte, in accordance with the invention, has either one or two normal signal transitions missing between at least one pair of successive signal transitions.

By the encoding of an address mark byte in this manner, multiple unique patterns of signal transitions may be provided for redundant synchronization of a subsequent bit stream. By means of a single address mark or multiple unique address marks, a false address mark or the failure to detect a true address mark is reduced due to the unconventional, readily identifiable patterns employed.

These and other advantages of the invention will become more apparent in the detailed description of preferred embodiments presented below.

DESCRIPTION OF THE DRAWINGS

The invention will be described with reference to the accompanying drawings, wherein.

DETAILED DESCRIPTION OF PREFERRED EMBODIMENTS

Figure 2:
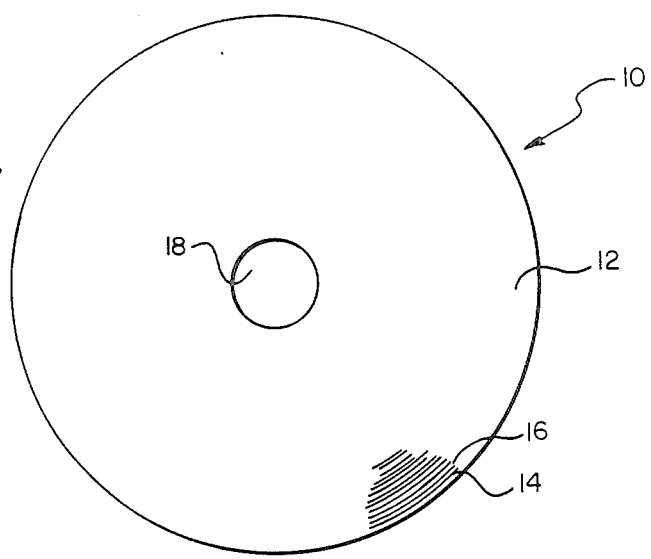
FIG. 2 is a schematic top view of an information-bearing disk.

FIG. 2 illustrates generally an information-bearing record medium 10 in the form of a disk 12. A recording surface of the disk includes a plurality of equally spaced data storing tracks 14 separated by a relatively narrow guardband 16 which serves to facilitate tracking and to reduce cross talk between the tracks. The tracks 14 are concentric with a central spindle drive aperture 18 of the disk 12 and, as such, may be either circular or in a spiral form.

Figure 3:
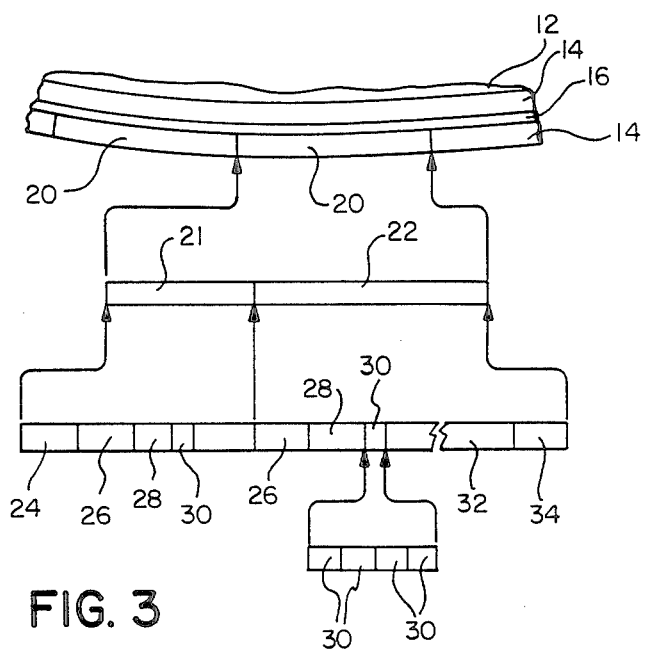
FIG. 3 illustrates the organization of information recorded on a record track of the disk of FIG. 2.
Figure 4:
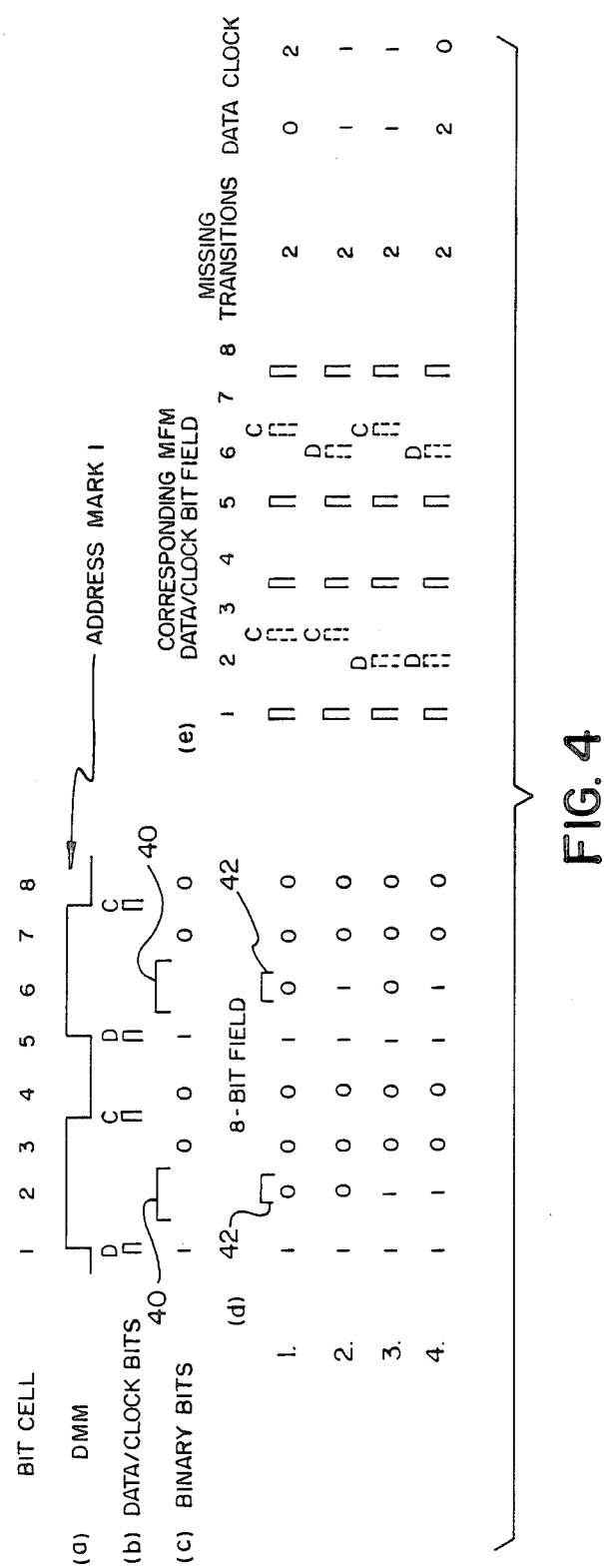
FIGS. 4 through 8 each consisting of a through e include a series of binary signal waveforms useful in characterizing address mark patterns according to the invention.

In accordance with a widespread standard, each track 14 is divided into a plurality of sectors 20 (FIG. 3). The sectors serve to divide information on each track into corresponding blocks comprising a predetermined number of bits. FIG. 3 further shows that the bits within a sector are arranged generally into two groups; the first group of bits 21 is known as a sector header; and the second group 22, which follows the sector header, is known as a data field.

The sector header 21 may, for example, include a blank area 24, between the beginning and end of physically adjacent sectors, that is used to prevent bit runover from one sector to the next; a fixed pattern of synchronization bits 26 that allow a channel decoder to synchronize to an incoming bit stream; phase synchronization bits 28 that allow the decoder to resolve phase ambiguity of a DMM and/or MFM code; an address mark 30 to identify the boundary of data within the data field 22; and a sector address 24 for direct access to data.

The data field 22, on the other hand, may also include the aforementioned synchronization bits 26, 28, and multiple address marks 30 to redundantly identify the leading edge of a stream of data bits 32. The usual form of a data field reserves multiple bytes at the end 34 of each sector 20 for error detection and correction of the data field, to provide a determination as to whether the data was accurately read.

Figure 1:
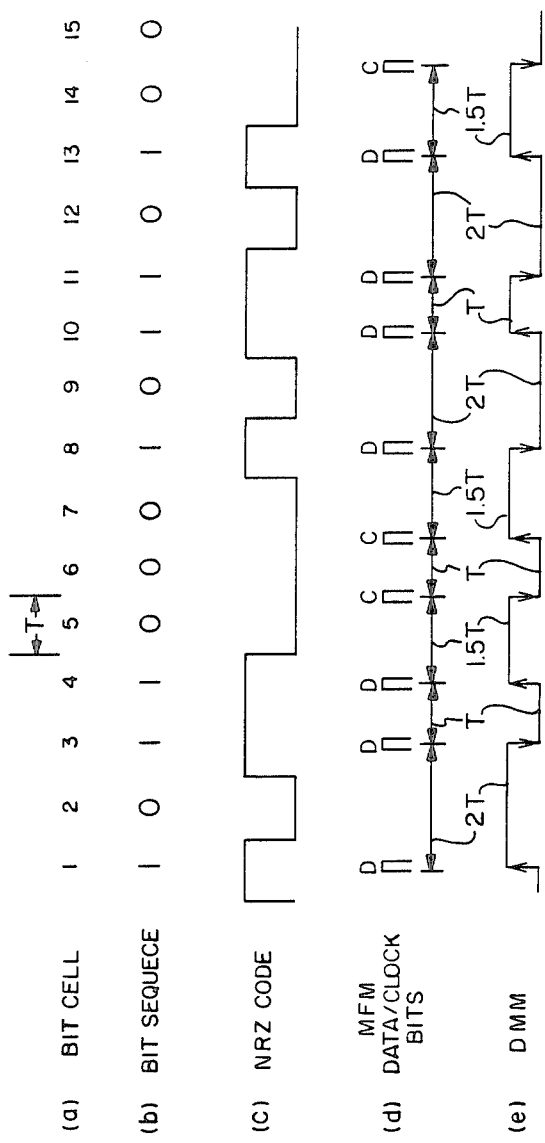
FIG. 1 consisting of a through e is a set of signal waveforms useful in describing a binary data encoding technique that is known in the art.

As described previously herein with regard to FIG. 1, a recorded stream of binary bits—synchronization, addresses, data, etc.—is commonly encoded into Miller format—a self-clocking binary signal which limits the minimum spacing between successive signal transitions to one bit cell (T) and the maximum separation between adjacent transitions to two bit cells (2 T). In that context, an object of the invention is to unambiguously identify an address mark byte from the total bit stream. Thus, multiple unique address mark bytes in the bit stream serve for redundantly identifying the start or the leading-edge boundary of a data stream.

To achieve the object of the invention, each address mark byte is defined by a unique pattern of signal transitions in which at least one normal signal transition is missing, to provide at least 2.5 bit cells and as many as 3.5 bit cells between at least one pair of successive signal transitions. Thus, each address mark pattern is readily distinguishable from any other address mark and from the rest of the bit stream, which is formed under normal encoding rules. A particular feature of the invention is that with multiple unique address marks, an ambiguity in the bit cell boundary of any address mark pattern still results in the unique pattern of signal transitions being interpreted unambiguously as a particular address mark.

Figure 5:
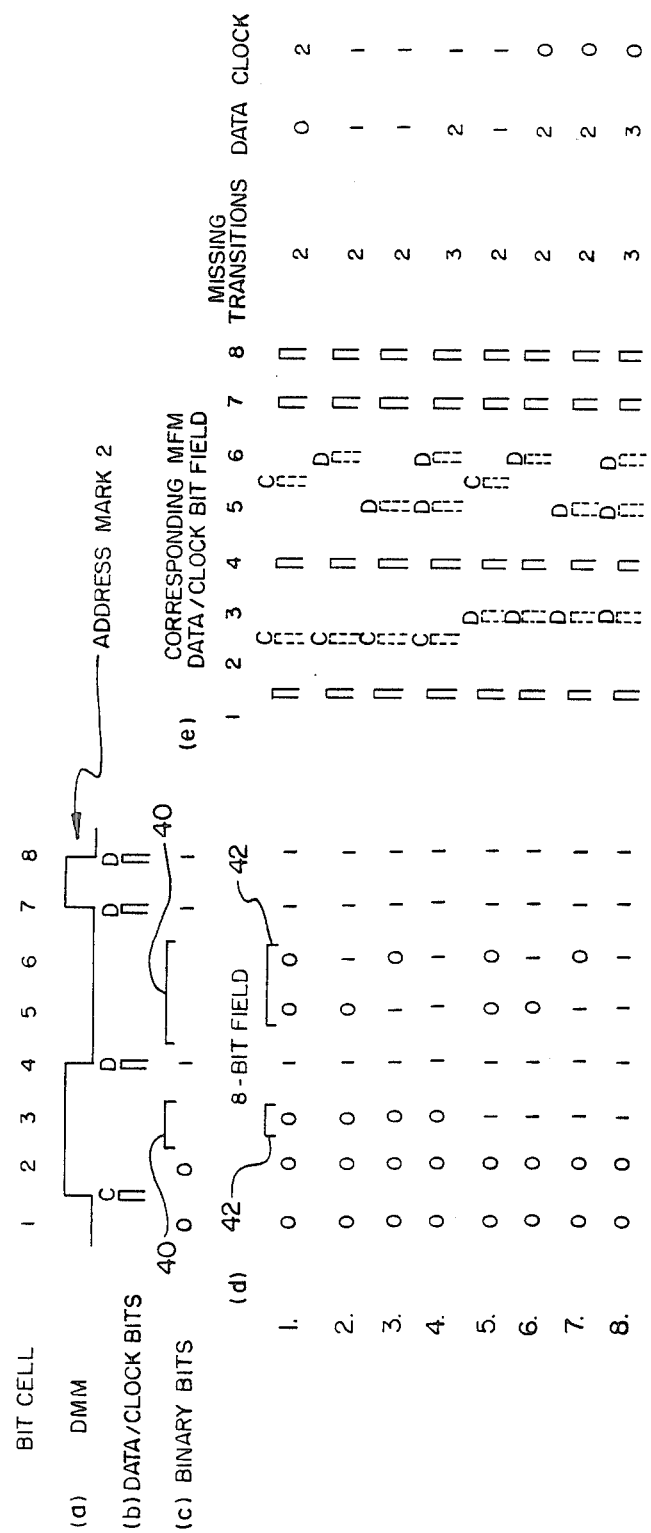
Figure 6:
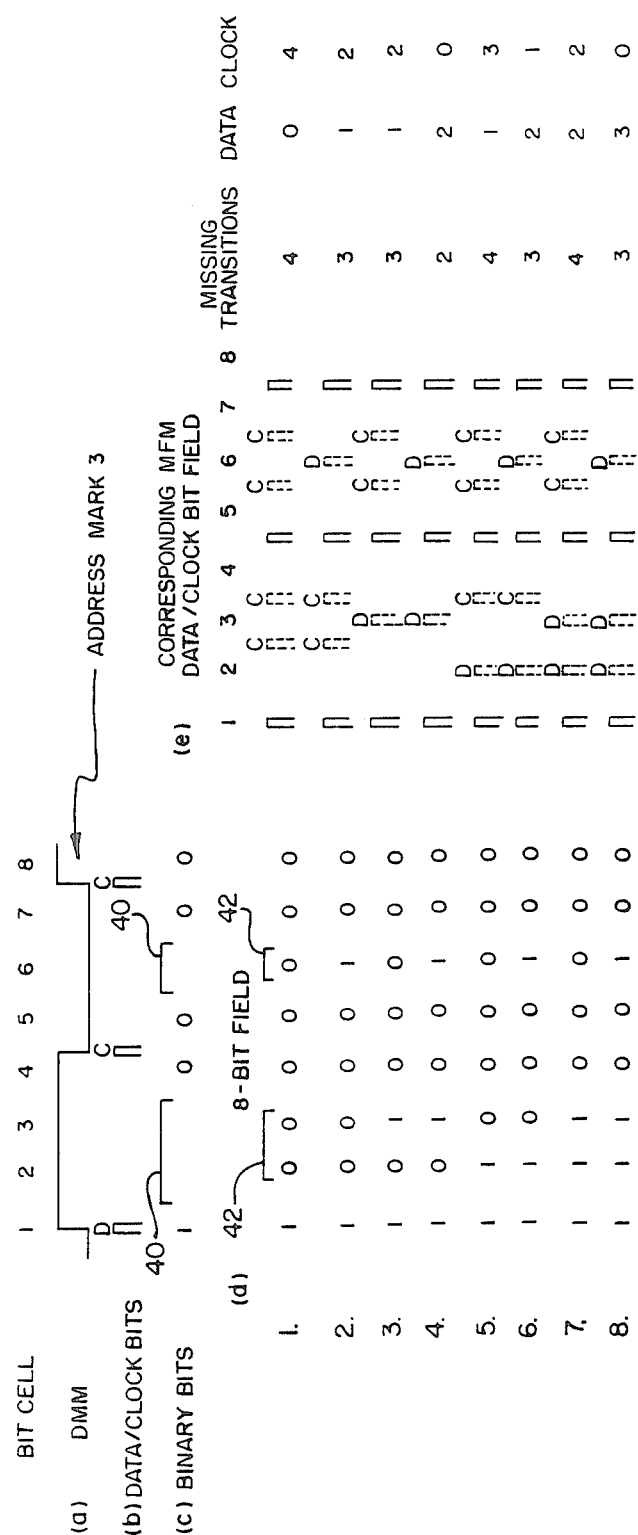
Figure 7:
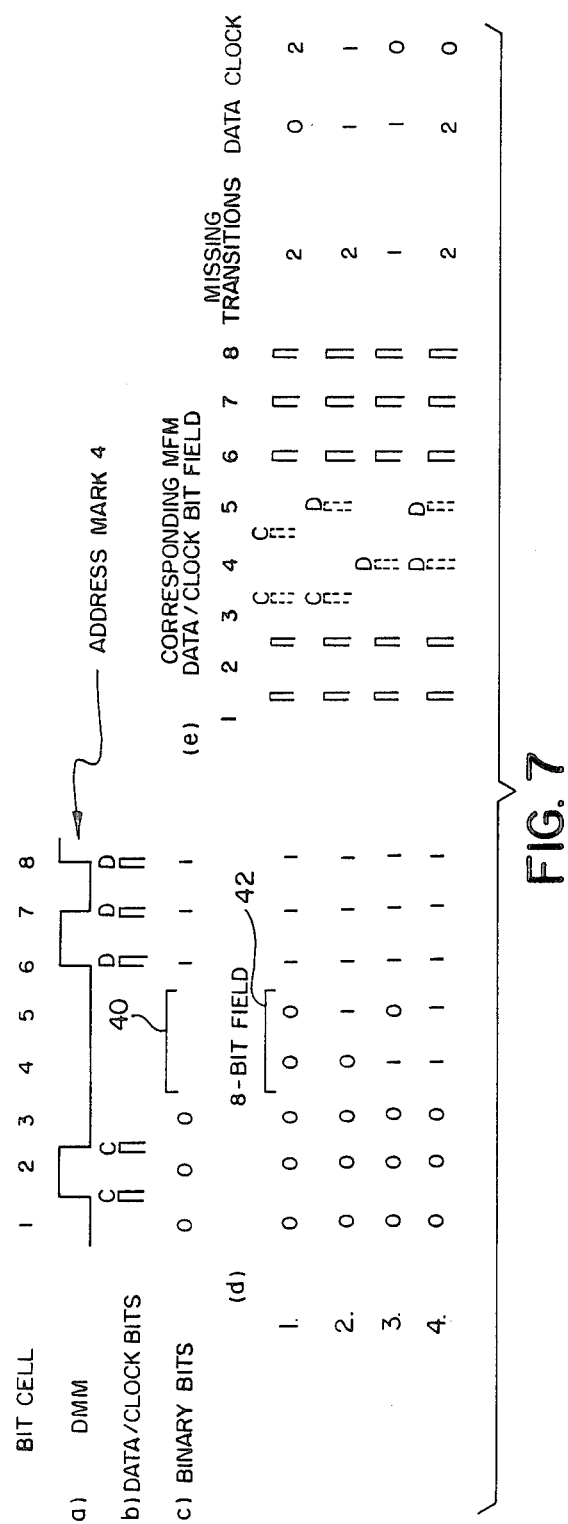
Figure 8:
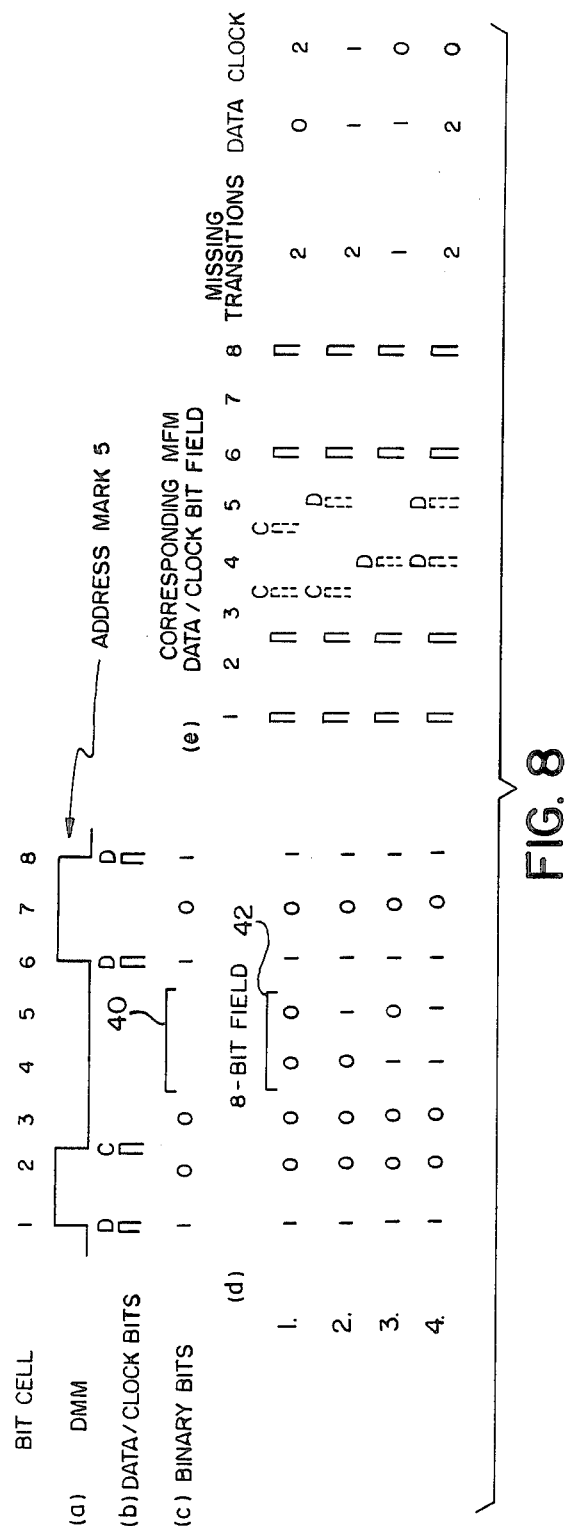

FIGS. 4(a), and 4(b) through 8(a) and 8(b) show, respectively, a pattern of signal transitions, in accordance with the invention, corresponding to each of five address mark bytes. In contradistinction to the normal encoding rules, each address mark pattern has at least one pair of successive signal transitions (either MFM or DMM) that are separated by at least 2.5 bit cells and as many as 3.5 bit cells. As can be readily seen, the pattern for address marks four and five (FIGS. 7 and 8) has one pair of successive signal transitions separated by 3.5 bit cells; the pattern for address mark one (FIG. 4) has two pairs of successive signal transitions each of which is separated by 2.5 bit cells; FIG. 5 shows that the pattern for address mark two has one spacing of 2.5 bit cells and a second spacing of three bit cells; and FIG. 6 illustrates that address mark three has one spacing of three bit cells and a second spacing of 3.5 bit cells.

FIGS. 4 through 8 further characterize the pattern for their respective address marks, with respect to a normally encoded pattern, in terms of the number of normal signal transitions that are missing. By means of brackets 40, FIG. 4(c) shows, for example, that the pattern for address mark one—DMM pattern of FIG. 4(a) and MFM pattern of FIG. 4(b)—has at least one missing signal transition corresponding to bit cells two and six. FIG. 4(d) illustrates the field of possible 8-bit patterns (bytes) corresponding to the address mark patterns of FIGS. 4(a) and 4(b). The byte field, as illustrated by brackets 42, is derived by inserting each of the possible combinations of bits into bit cells 2 and 6. With two missing bits from the field, there are, of course, a total of four possible 8-bit patterns in the field.

FIG. 4(e) shows the field of data and/or clock bits corresponding to the byte field of FIG. 4(d). FIG. 4(e) further illustrates, by means of phantom lines, whether a missing signal transition should be at the middle of a bit cell (a missing MFM data bit-D) or should be at the trailing edge boundary of the bit cell (a missing MFM clock bit-C). For each of the four possible 8-bit configurations, two have both a missing clock bit and a data bit, whereas one byte pattern has two missing clock bits and one byte has two missing data bits.

FIGS. 5 through 8 similarly characterize the signal transition patterns for address marks two through five, respectively. Note from FIG. 6(e) that the pattern for address mark three can have as many as four missing transitions. FIG. 6(e) further shows, as do FIGS. 5(e), 7(e), and 8(e), that there may be either one or two missing transitions between successive signal transitions in the corresponding address mark pattern. FIGS. 7(e) and 8(e) show also that their corresponding address mark patterns may have a total of only one missing signal transition.

Figure 9:
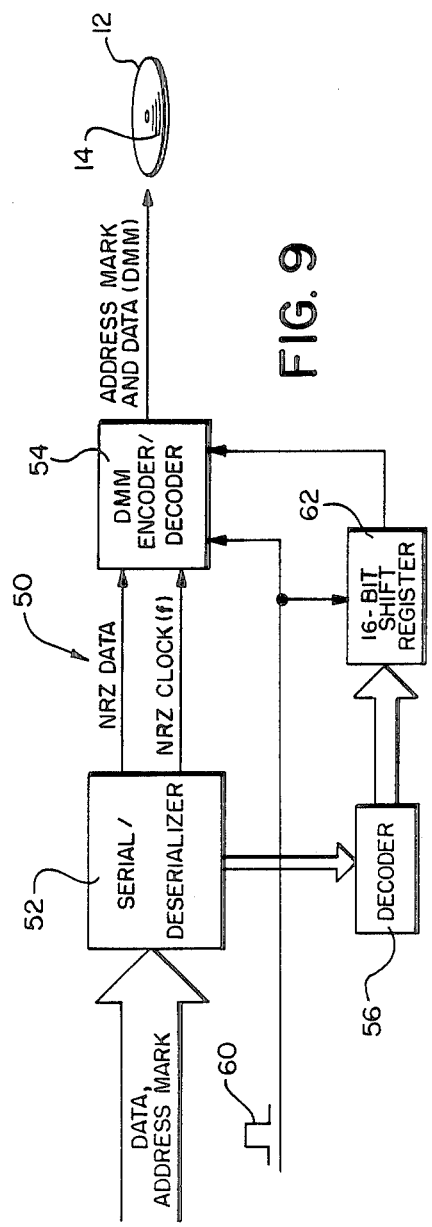
FIG. 9 is a block diagram showing electronics for writing an address mark serially with data onto a disk.

FIG. 9 shows, in block diagram form, exemplary circuitry 50 for writing a DMM address mark byte serially with DMM data when the recording surface of disk 12 is optical. For that purpose, serial/deserializer circuitry 52 accepts, from a conventional disk drive controller (not shown), a stream of multiplexed multi-bit words coded to indicate that each word is either NRZ data or a binarily encoded address mark. Following its demultiplexing operation, the circuitry 52 applies (1) NRZ data in serial form together with an NRZ clock signal to a DMM encoder/decoder circuitry 54, or (2) the encoded address mark to a decoder 56. The clock signal is at a frequency, f, the period of which corresponds to the width of each bit cell.

The decoder 56 serves to decode the address mark received into a 16-bit word which represents the pattern of MFM signal transitions in the corresponding DMM address mark byte.

The aforementioned controller also serves to provide a strobe pulse 60 which identifies when the address mark received is to be written in series with the data stream. For that purpose, the strobe pulse 60 enables a delay section of the circuitry 54, to inhibit data flow for a time sufficient to insert the address mark byte serially into the data stream. At the same time, the strobe pulse 60 causes a shift register 62 to apply the aforementioned 16-bit word to the circuitry 54 for encoding in DMM format.

During a write operation, the circuitry 54 serves to encode both the NRZ data and the address mark byte into DMM format and to apply the data and address mark in serial form to an optical head (not shown) of the disk 12 for recording.

Figure 10:
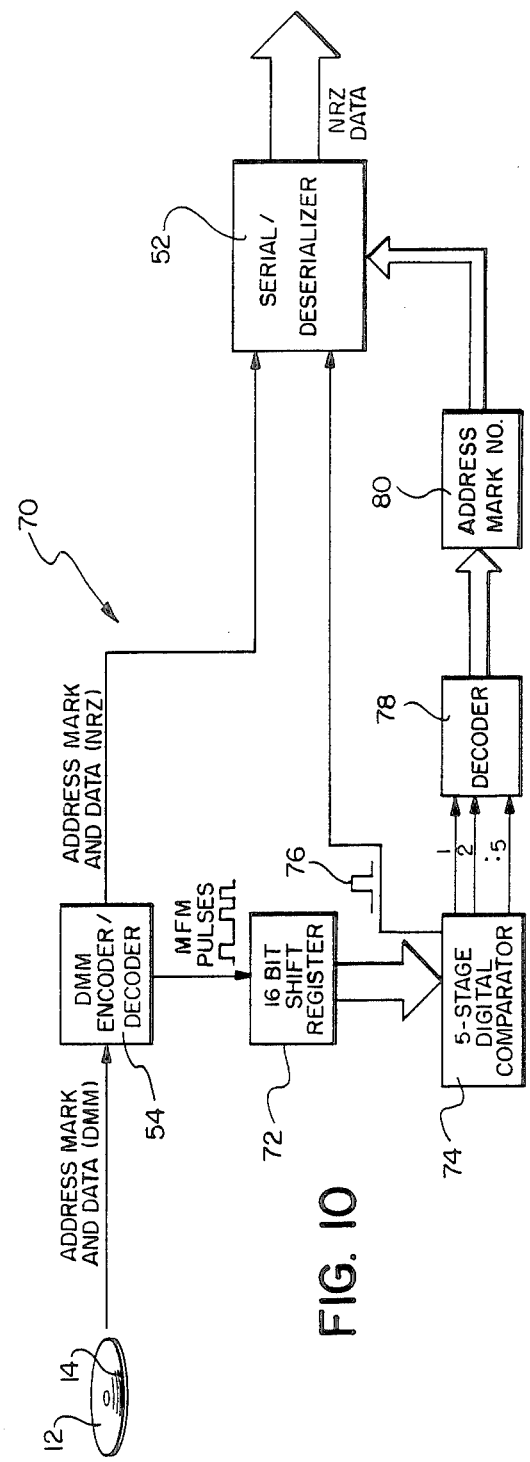
FIG. 10 is a block diagram showing electronics for reading an address mark from a disk.

FIG. 10 shows, in block diagram form, circuitry 70 for reading an address mark from the disk 12. Elements of FIG. 10 that are identical or functionally similar to elements of FIG. 9 are identified by like numerals.

For reading an address mark, the DMM encoder/decoder circuitry 54 serves to decode the incoming stream of DMM data and DMM address marks into NRZ format. To that end, the circuitry 54 first produces an MFM pulse, in synchronism with each state transition in the DMM signal stream—either at the center or the trailing-edge boundary of the corresponding bit cell.

A 16-bit shift register 72 receives the train of MFM pulses and clocks them sequentially, in clusters of sixteen, through a multistage digital comparator 74.

The comparator 74 serves to detect and to identify each address mark byte in the MFM pulse train. To that end, the comparator 74 consists of five separate comparators each of which is programmed to a unique 16-pulse cluster that is equal to the pattern of MFM pulses corresponding to a particular one of the address marks. Thus, when one of the address mark bytes is clocked through the circuitry 70, the comparator 74 produces an output on the corresponding one of its five outputs. At the same time, the comparator 74 produces a strobe pulse 76 which identifies that an address mark is detected.

A decoder 78 serves to produce a 3-bit word corresponding to which of the five address marks is detected. Circuitry 80, in response to the output of the decoder 78, provides, to the serial/deserializer 52, a number indicative of the NRZ bytes yet to be received from the decoder circuitry 54 before the data stream arrives.

During a reading operation, the serial/deserializer circuitry 52 transfers the NRZ data stream in parallel form to the controller.

ADVANTAGEOUS TECHNICAL EFFECT

From the foregoing, it will be clear to those skilled in the digital recording art that the circuitry 70 incorporates redundancy for unambiguously detecting when data, in a bit stream, arrives from an information-bearing record medium, such as the disk 12. That is, if the circuitry 70 fails to detect a given address mark, for whatever reason, the use of multiple unique address marks provides subsequent opportunities for synchronization with the data stream.

Unlike the prior art, each address mark, in accordance with the invention, corresponds to a unique pattern that is readily distinguishable, and thereby detectable, from normally encoded data. A further feature of the invention is that an ambiguity in the bit cell boundary of any address mark still results in each unique pattern of signal transitions being interpreted unambiguously as a particular address mark.

The invention has been described in detail with reference to the figures, however, it will be appreciated that variations and modifications are possible within the spirit and scope of the invention.

What is claimed is:

1. In a record storage medium having a stream of self-clocking binary bits in which a bit of one value is normally represented by a signal transition at the middle of its corresponding bit cell and a bit of the other value is normally represented by a signal transition substantially at the boundary between its corresponding bit cell and the immediately following bit cell so long as the two adjacent bit cells correspond to successive bits of such other value, whereby the spacing between successive normal signal transitions is at least one bit cell and is no greater than two bit cells, the improvement wherein the stream of binary bits includes an address mark, for identifying a future substream of binary bits, defined by a unique pattern of signal transitions having at least one pair of successive signal transitions separated by more than two bit cells.

2. An address mark for a record storage medium as claimed in claim 1 wherein said unique pattern of signal transitions is representative of a sequence of eight bits in which at least one normal signal transition is missing.

3. An address mark for a record storage medium as claimed in claim 1 wherein said unique pattern of signal transitions is representative of a sequence of eight bits in which at least one normal signal transition is missing between the middle of the second bit cell and the boundary separating the sixth and seventh bit cells.

4. An address mark for a record storage medium as claimed in claim 1 wherein said unique pattern of signal transitions is representative of a sequence of eight bits in which at least one and as many as four normal signal transitions are missing.

5. An address mark for a record storage medium as claimed in claim 1 wherein said unique pattern of signal transitions is representative of a sequence of eight bits in which at least one normal signal transition is missing between each of two pairs of successive signal transitions.

6. An address mark for a record storage medium as claimed in claim 5 wherein said unique pattern of signal transitions includes two normal signal transitions missing between each of said two pairs of signal transitions.

7. In a record storage medium having a stream of self-clocking binary bits in which a bit of one value is normally represented by a signal transition at the middle of its corresponding bit cell and a bit of the other value is normally represented by a signal transition substantially at the boundary between its corresponding bit cell and the immediately following bit cell so long as the two adjacent bit cells correspond to successive bits of the other value, whereby the spacing between successive normal signal transitions is at least one bit cell and is no greater than two bit cells, the improvement wherein the stream of binary bits includes a plurality of N address mark bytes to redundantly identify a particular future substream of binary bits, each address mark byte is defined by a unique pattern of signal transitions representative of a particular one of N different sequences of eight bits but which has at least one normal signal transition missing, to cause at least one pair of successive signal transitions in each of said N patterns to be separated by more than two bit cells and less than four bit cells.

* * * * *